Figure 1:
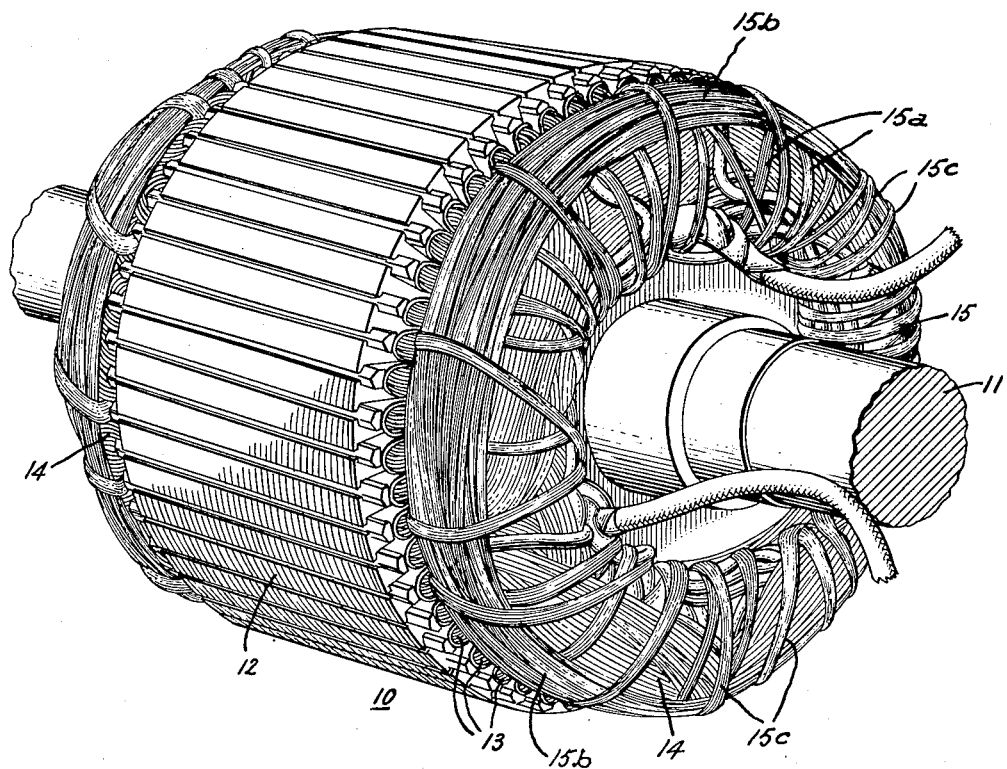

May 22, 1956   M. E. PETERSEN ET AL   2,747,119
BINDING OF ROTOR END TURNS
Filed Sept. 3, 1953

Inventors:
Maurice E. Petersen,
Albert B. Zeissler,
by  Claude H. Matt
Their Attorney.

2,747,119

BINDING OF ROTOR END TURNS

Maurice E. Petersen and Albert B. Zeissler, Schenectady, N. Y., assignors to General Electric Company, a corporation of New York Application September 3, 1953, Serial No. 378,348

5 Claims. (Cl. 310—270)

This invention relates to dynamoelectric machine rotors and has particular significance in connection with the binding of rotor end turns in wound rotors of large diameter in which the windings are formed of wire of small size.

In the manufacture of electric motors it is desirable to use coils having a plurality of turns and made from wire of small diameter rather than form wound coils of large cross section, due to the ease of manufacture of coils made of small wire with the resultant saving in cost. In addition, the use of coils formed of small wire permits a versatility in the number of turns and in the making of connections between the various coils to provide for flexibility in electrical design. Heretofore, the use of small wire coils in dynamoelectric machines having rotors of large diameters and especially those of high speeds, have been impractical because of the lack of a satisfactory method for supporting the coils made of small size wire against the effects of centrifugal force.

Previously, to support the end turns of dynamoelectric machine rotors of large diameter, an insulated steel tie ring has been inserted within the space defined by the inner periphery of the rotor end turns and the shaft. The rotor end turns have been tied thereto by means of cotton cord which was looped around the tie ring and the end turns at a plurality of points about the periphery. Each of the loops have been knotted and fastened in its peripheral location to maintain the integrity of the loops and to prevent the loops from slipping from one portion of the winding end turns to another under the urging of centrifugal force which tends to cause portions of the winding end turns to move radially outwardly. In addition to the problems inherent in this type of construction for preventing the winding end turns from moving radially outwardly under the action of centrifugal force, the tie ring has also occupied a substantial portion of the area between the inner periphery of the winding end turns and the shaft consequently interfering with the amount of air which could pass therethrough for cooling the rotor end turns and the rotor core.

It is an object of this invention to provide a simple and inexpensive means for overcoming the above-mentioned difficulties.

A further object of this invention is to provide for the elimination of the iron ring to which the rotor end turns have previously been secured.

It is a further object of this invention to provide for the support of the rotor end turns which will increase the cooling thereof, and will also permit the operation of the rotor at higher peripheral speeds than has heretofore been possible.

It is still further an object of this invention to provide means for securing the end turns which is quickly and easily installed and will secure the rotor end turns against centrifugal force.

Further objects and advantages of this invention will become apparent and this invention will be better understood by reference to the accompanying drawing and description, and the features of novelty which characterize this invention will be pointed out with particularity in the claims annexed to and forming part of this specification.

In accordance with this invention, there is provided a fibrous roving material, preferably having continuous substantially parallel glass fibers, which is impregnated with a thermosetting resinous material so that it is soft, flexible or limp, tack-free in its natural state. This material may also be stored for a period up to at least three months. The roving is looped at frequent intervals around the end turns of the coil so that it forms a continuous spiral which tightly binds the various portions of the end turns together. It is not necessary to knot or otherwise tie the various convolutions of the roving. Upon the curing of the thermosetting resin in the roving, a continuous rigid end turn supporting spiral of substantially the strength of iron results which holds the relatively flexible end turns rigidly against the action of centrifugal force. In the preferred form of this invention, a plurality of overlapping turns of the roving are wrapped around the outer periphery of the rotor end turns to form a conical shroud and to provide additional support for the end turns. This shroud forms an integral bond with the convolutions of the spiral to provide a means for securing end turns which will permit a higher peripheral speed of the rotor or, stated in another way, will permit the use of coils formed of small size wire in lieu of the form wound coils in large rotors. In addition to providing support for the end turns, the shroud also provides a baffle to direct the cooling air between the adjacent coils near the rotor core to permit the use of higher load currents through the windings without overheating of the motor.

In the drawing, Fig. 1 is a perspective view of a rotor for dynamoelectric machines incorporating this invention.

Figure 2:
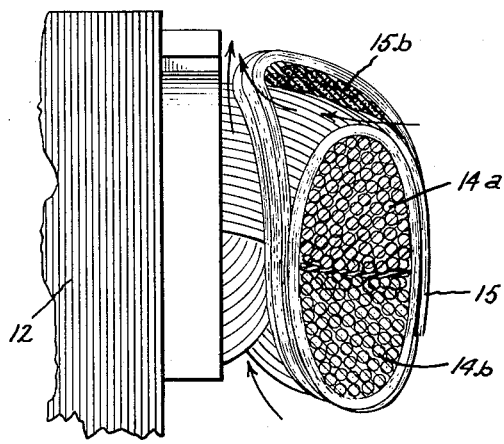

Fig. 2 is a fragmentary enlarged sectional view of the form of this invention illustrated in Fig. 1 showing the increased cooling provided by this invention.

Referring to Figs. 1 and 2, there is shown a portion of a rotor for a dynamoelectric machine having winding coils formed of a plurality of turns of small size magnet wire, which is primarily intended for use in machines of large capacity having large diameter rotors and operable at high speeds.

The rotor, generally indicated by the numeral 10, has a shaft 11 on which the magnetic rotor core 12 is mounted. Core 12 is provided with coil slots in which coils 13 are positioned in the usual manner. Coil 13 provides coil end turns 14 at each end of rotor 10 and, due to the effect of centrifugal force, these coil end turns must be firmly supported in view of the flexibility of the small size wire used in the coil.

This invention provides a method for supporting the end turns 14 which is believed to be novel. Roving 15 formed of a fibrous material and preferably of continuous filament, loosely constructed, substantially parallel glass fibers, is impregnated with a thermosetting resinous material so that the roving 15 is flexible, or limp, and tack-free and can be stored for a relatively long period of time in a flexible state prior to use.

The following composition has been found to be a suitable thermosetting resinous material with which to impregnate roving 15: (1) a polymerizable unsaturated alkyd resin obtained by the esterification reaction of a mixture of ingredients comprising a polyhydric alcohol and an alpha unsaturated alpha-beta polycarboxylic acid, e. g., diethylene glycol maleate; (2) a copolymerizable different monomer, e. g., styrene, polyesters compatible with the above unsaturated alkyd resin obtained by esterification of allyl alcohol with a polybasic acid, specifically a polycarboxylic acid, e. g., diallyl phthalate, etc., in the ratio, by weight, of about 1 part to 1 to 3 parts of (1); (3) a catalyst for accelerating the copolymerization of the ingredients of (1) and (2), e. g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e. g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

This composition is particularly well adapted for use in impregnating a self-tightening coil supporting member because it has a volume shrinkage coefficient of 8% and a linear shrinkage coefficient of 2% which it imparts to the coil supporting member during curing.

This impregnated roving material is disclosed and claimed in copending application of Almy D. Coggeshall and Linn T. Stafford, Serial No. 379,165, filed September 9, 1953, which is assigned to the assignee of the present invention.

The impregnating composition may be applied to the roving 15 in any desired manner, preferably by dipping the roving in a bath of an impregnating material. After this impregnation of the roving, it is dried to evaporate the solvents therefrom, so that the roving becomes tack-free. It may then be stored for a period over three months or used immediately.

After the flexible roving is assembled on the rotor, the impregnating composition therein may be cured, as for example, by baking the rotor assembly at 135° C. for approximately one-half hour.

The roving 15 envelops the end turns of the various coils in a plurality of loops 15a at closely spaced intervals about the periphery of the end turns to form an open, generally spiral encasement closely wrapped about the end turns. It is preferable that the loops 15a of the spiral be formed of a continuous piece of roving 15 with its ends joined together to form an endless spiral encasement for the end turns. After the roving 15 has been spiraled around the coil end turns binding the various end turns of the various coils together, it may be baked to cure the thermosetting resin impregnated in the roving to produce a rigid, self-forming spiral encasement securing the various coil end turns together and preventing relative movement therebetween. High polymer thermosetting resins are important in this respect because tests have shown that the high shrinkage coefficient of these resins, which is imparted to the roving, causes the roving 15 to become shorter in length during the curing of the resin to tighten the loops on the end turns to substantially increase the support of the supporting spiral encasement. Further, since relative movement between the end turns of the various coils is prevented, the coil end turns will reinforce each other.

In the preferred form of the invention, a plurality of peripheral turns 15b are provided to form a radially thin, axially spread out restraining member, as best shown in Fig. 2, which supports substantially all portions of the rotor end turns. The end turns are preferably tapered toward the shaft at their ends so that the shroud formed by turns 15b is conical to provide a more efficient guide for the cooling air passing through the end turns. Additional loops 15c of roving are provided to encompass the end turns and the shroud 15b. Upon heating the roving to cure the resin therein, it becomes rigid and loops 15a together with shroud 15b and loops 15c become an integrally bonded structure which supports the winding end turns against centrifugal force.

Tests have been made to determine the effectiveness of the end turn supporting structure of Fig. 1. At 500% rated speed, the supporting structure of Fig. 1 was still intact without any sign of damage to, or deformation of the end turns or roving, whereas with the cotton cord construction previously used, satisfactory results were obtained when the speed was limited to approximately 125% rated speed. The importance of this invention is even more significant when it is also considered that the tensile strength of the cotton cord used for the test was 206 lbs. and the tensile strength of the glass roving used for the test was 156 lbs.

Referring now specifically to Fig. 2 there is illustrated the means by which the peripheral convolutions formed of roving 15b serves to increase the cooling effectiveness of the rotor end turns. It will be observed that the overlapping relationship of the individual convolutions of the roving results in a self-forming shroud about the outside of the winding, and directs the flow of the air beneath the winding toward the punchings as indicated by the arrows on Fig. 2. It is to be further noted that because the shroud 15b directs the air through the open portions of the windings, the portions of the end turns emerging from the rotor core will serve as fan blades, thus drawing air through the coils and dissipating a greater amount of heat from the rotor and its end turns. Because this invention eliminates the need for a tie ring located between the shaft and the internal periphery of the end turns, the amount of area available for the flow of cooling air is approximately doubled. The combined effect of this increase in area and shroud 15b results in a rotor construction which may be safely operated under higher load conditions.

With the elimination of the metal tie rings positioned within the inner periphery of the rotor end turns, a second advantage is achieved. If the ring is formed of a magnetic material, the reactance of the rotor is increased due to flux linking the magnetic ring and the windings. While this is not critical in the ordinary wound rotor induction motor operating at low rotor electric frequencies, this reduced reactance may be quite important where rotor frequencies are high as in induction type frequency convertors.

Thus it is apparent that there is provided by this invention a means for securing the end turns of a wound rotor wherein the end turns are integrally bound by a flexible thermosetting resin impregnated roving material which is baked to produce a rigid self-forming, self-tightening, open, generally spiral encasement supporting the end turns in their relative positions. In addition, the use of an air directing shroud surrounding the end turns, and the elimination of the metal tying ring within the inner periphery of the winding end turns increases the transfer of heat from the rotor to result in a rotor construction utilizing small diameter wire for windings for use on high capacity, high speed machines.

While there has been illustrated and described particular embodiments of this invention, modifications thereof will occur to those skilled in the art. It is to be understood, therefore, that this invention is not limited to the particular arrangements described, and it is intended in the appended claims to cover all modifications which do not depart from the true spirit and scope of this invention.

What we claim as new and desire to secure by Letters Patent of the United States is:

1. A member for a dynamoelectric machine comprising a core formed of magnetic material and having winding slots therein, windings in said slots having end turns projecting beyond the ends of said core and means for supporting said end turns against the effect of centrifugal force comprising a flexible roving impregnated with a heat-reactive thermosetting resinous composition forming a plurality of overlapping convolutions about the outer periphery of said end turns and also forming a plurality of loops spirally enveloping said peripheral convolutions and said end turns, said roving being baked after installation to integrally bond said loops and said convolutions into a rigid supporting structure.

2. A rotor for a dynamoelectric machine having a core formed of magnetic material and providing winding slots, windings in said slots having end turns projecting beyond the ends of said core, and means for supporting said end turns against the effect of centrifugal force, said means comprising a flexible roving formed of a fibrous material having substantially parallel continuous filaments impregnated with a thermosetting resinous material, said roving being arranged about the outer periphery of said end turns in a plurality of convolutions having an overlapping relationship and forming a substantially solid supporting shroud of thin cross section, said roving also providing a plurality of loops enveloping said shroud and said end turns at a plurality of peripheral positions, said shroud and said loops being integrally bonded together upon the curing of said resinous material to provide a unitary self-tightening structure supporting said end turns against centrifugal force.

3. A rotor for a dynamoelectric machine comprising a core member formed of magnetic material and having winding slots therein, windings in said slots having end turns projecting beyond the end of said core, a shroud spaced from said core and surrounding said end turns, said shroud being formed of a plurality of overlapping convolutions of roving formed of a flexible fibrous material impregnated with a thermosetting resinous composition baked to form a rigid supporting structure for resisting the effect of centrifugal force on said end turns and to provide means for directing the air through said end turns between the shroud and the end of said core to increase the amount of heat transferred from the rotor.

4. A rotor for a dynamoelectric machine comprising a core member formed of magnetic material and having winding slots therein, windings in said slots having end turns extending beyond the ends of the core, and means for supporting the end turns against centrifugal force comprising a plurality of loops spirally enveloping the end turns of the respective coils at a plurality of closely spaced peripheral points on said end turns with each loop being located substantially in an axial plane passing through said rotor, said loops being formed of a flexible roving impregnated with a thermosetting resinous material cured to provide a plurality of self-forming self-tightening clamps rigidly securing the end turns together.

5. A rotor for a dynamoelectric machine comprising a core member formed of magnetic material and having winding slots therein, windings in said slots having end turns extending beyond the ends of the core, and means for supporting the end turns against centrifugal force comprising a plurality of loops formed approximately as a helix generated about a circle perpendicular to the axis of the rotor and enveloping the end turns of the respective coils at a plurality of closely spaced peripheral points on said end turns to form a continuous generally spiral encasement for said end turns, said loops being formed of a flexible roving impregnated with a thermosetting resinous material cured to provide a plurality of self-forming clamps rigidly securing the end turns together.

References Cited in the file of this patent

UNITED STATES PATENTS

| | | |
|---|---|---|
| 630,930 | Reist | Aug. 15, 1899 |
| 2,519,219 | Baudry et al. | Aug. 15, 1920 |
| 2,594,693 | Smith | Apr. 29, 1952 |
| 2,602,829 | Fromm et al. | July 8, 1952 |